Figure 1:
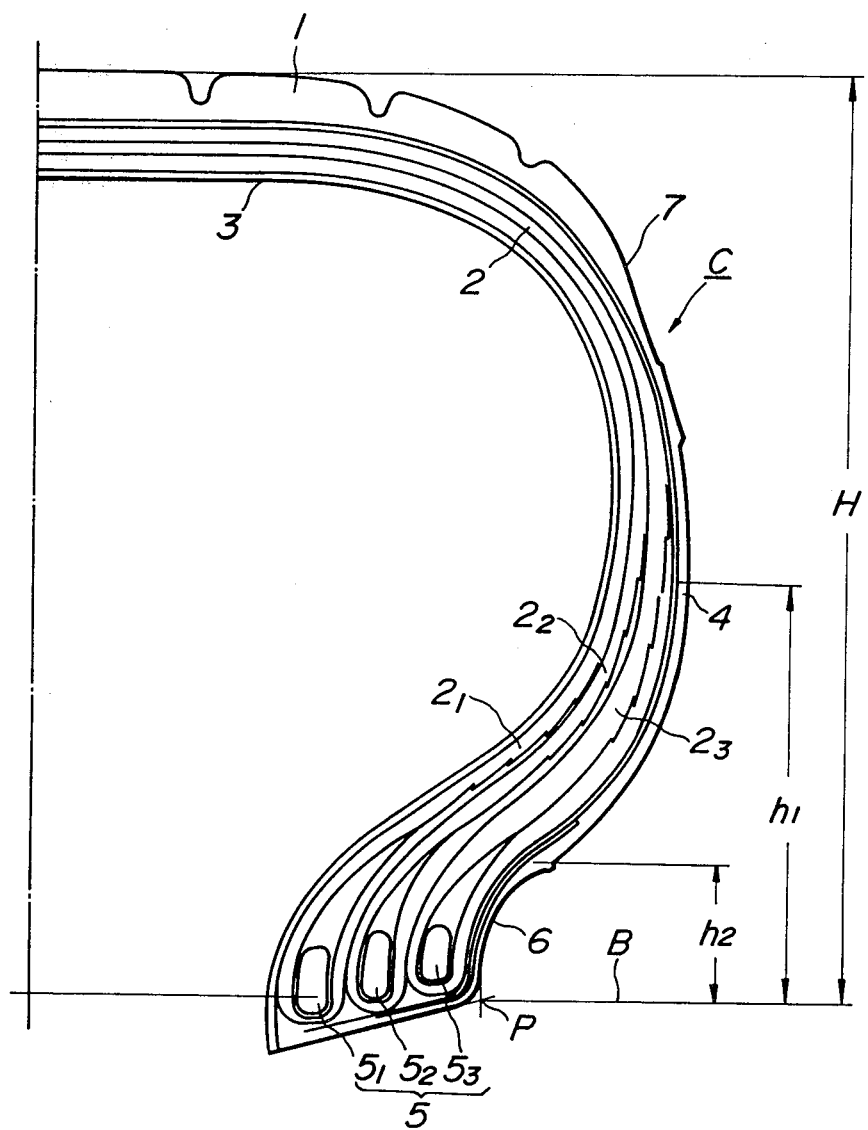

United States Patent [19]

Takahashi

[11] 4,442,880

[45] Apr. 17, 1984

[54] HEAVY DUTY PNEUMATIC TIRES

[75] Inventor: Masanobu Takahashi, Iruma, Japan

[73] Assignee: Bridgestone Tire Company, Ltd., Tokyo, Japan

[21] Appl. No.: 483,208

[22] Filed: Apr. 13, 1983

Related U.S. Application Data

[63] Continuation-in-part of Ser. No. 318,494, Nov. 5, 1981, abandoned.

[30] Foreign Application Priority Data

Nov. 12, 1980 [JP] Japan .................. 55-158098
Feb. 16, 1981 [JP] Japan .................. 56-20222

[51] Int. Cl.³ .................................. B60C 9/06
[52] U.S. Cl. ........................... 152/356 R; 152/354 R; 152/360
[58] Field of Search ............ 152/354 R, 354 RB, 355, 152/356, 357 R, 360, 358

[56] References Cited

U.S. PATENT DOCUMENTS

| | | | |
|---|---|---|---|
| 1,552,950 | 9/1925 | Pushee | 152/356 |
| 1,616,069 | 2/1927 | Tuttle et al. | 152/354 |
| 2,006,315 | 6/1935 | Hopkinson | 152/356 |
| 2,188,174 | 1/1940 | Castricum et al. | 152/357 R |
| 2,317,912 | 4/1943 | Howe | 152/356 |
| 2,990,870 | 7/1961 | Vittorelli | 152/356 |
| 3,989,083 | 11/1976 | Chrobak | 152/361 R |
| 4,029,137 | 6/1977 | Suydam | 152/354 R |
| 4,257,469 | 3/1981 | Uemura | 152/354 R |
| 4,295,512 | 10/1981 | Kawaguchi et al. | 152/354 R |
| 4,340,105 | 7/1982 | Abe | 152/354 R |
| 4,349,062 | 9/1982 | Tsurunaga et al. | 152/354 R |

Primary Examiner—Edward C. Kimlin
Assistant Examiner—F. K. Wine
Attorney, Agent, or Firm—Sughrue, Mion, Zinn, Macpeak & Seas

[57] ABSTRACT

A heavy duty pneumatic tire having an improved durability is disclosed. This tire comprises a carcass of a bias structure composed of at least 12 rubberized laminated ply layers each containing organic fiber cords embedded therein, and divided into three inner, middle and outer ply groups by three bead cores, the cords of which are crossed with each other, as a reinforcement for a toroidal casing inclusive of a tread. In a region extending from an upper area of a bead portion of the casing within a range of 0.15 to 0.45 times a tire height as measured from a bead base of the tire, at least an average cord distance between adjacent ply layers at the middle and outer ply groups is made substantially wider than at the inner ply group and a cord distance between adjacent ply layers at the outer ply group is made substantially not more than at the middle ply group.

2 Claims, 2 Drawing Figures

Prior Art

Example 1

Example 2

HEAVY DUTY PNEUMATIC TIRES

This application is a continuation-in-part of the co-pending application Ser. No. 318,494 filed Nov. 5, 1981 now abandoned.

This invention relates to heavy duty pneumatic tires, and more particularly to a heavy duty pneumatic tire which effectively eliminates failures frequently produced in a region extending from an upper area of a bead portion to a lower area of a shoulder portion under severe use conditions of the tire, particularly cord breaking of a carcass.

A typical example of the heavy duty pneumatic tires is tires for airplanes. In the tire of this type, attempts have been made to improve performance characteristics under severe use conditions that occurred with the remarkable enlargement of, for example, the airplane body. Lately, safety standards for such tires have become severe, so that a strong demand exists to develop tires satisfying the above standards.

That is, it is required to have performance such that the tire not only is durable to strong landing shocks but also can safely and continuously be run without trouble even under an over-load, for example, occurring by the puncture of a tire among tires attached side by side to the same axle. Particularly, separation failure between ply layers (hereinafter referred to as ply separation), cord breaking of carcass (hereinafter abbreviated as CBU) and the like, which have never been observed under use conditions for ordinary tires, are caused by a tire loading redoubled under the above over-load condition in a region extending from an upper area of a bead portion to a lower area of a shoulder portion.

The inventor has made various investigations on such failures and found that when the tire of this type comprising three bead cores in each of bead portions and a carcass usually composed of plural laminated plies, wherein the number of plies is usually at least 12 and sometimes 24 or more, is run under load, particularly an over-load, the region extending from the upper area of the bead portion to the lower area of the shoulder portion is subjected to various deformations, whereby a large tension strain is repeatedly produced inward the region. Also, a large compression strain is repeatedly produced outward the region, which results in the occurrence of the ply separation or CBU due to the fatigue of cords.

The inventor has made further investigations with respect to the carcass of the ply laminated structure, wherein the cords of the carcass are durable to the compression force at the outer portion of the aforementioned region without causing the failures even under the over-load as mentioned above, and created heavy duty pneumatic tires satisfying the above mentioned requirements and having excellent fatigue resistance of carcass.

Therefore, the invention not only is adaptable to the safety standards satisfying the severe requirements on tires for airplanes, but also can advantageously enhance the safety on common heavy duty pneumatic tires inclusive of the airplane tires, such as a heavy duty pneumatic tire such for construction vehicles or the like under usual loading.

According to the invention, a heavy duty pneumatic tire comprises a carcass of a bias structure composed of at least 12 rubberized laminated ply layers each containing organic fiber cords embedded therein, and divided into three inner, middle and outer ply groups by three bead cores, the cords of which are crossed with each other, as a reinforcement for a toroidal casing inclusive of a tread. In a region extending from an upper area of a bead portion of said casing within a range of 0.15 to 0.45 times a tire height as measured from a bead base of the tire, at least an average cord distance between adjacent ply layers at said middle and outer ply groups is made substantially wider than at said inner ply group and a cord distance between adjacent ply layers at said outer ply group is made substantially not more than at said middle ply group.

In the tire according to the invention, the effect of improving the fatigue resistance of the carcass is obtained by making the cord distance between adjacent ply layers at the middle and outer ply groups larger than at the inner ply group and also making the cord distance between adjacent ply layers at the outer ply group not more than at the middle ply group. In this case, however, the tire weight is apt to increase, so that it may not be effectively applied to a tire size having particularly severe requirements for tire weight. Now, the inventor has made studies with respect to heavy duty pneumatic tires satisfying the aforementioned requirements while controlling the increase of the tire weight and having the improved fatigue resistance of the carcass. As a result it has been confirmed that it is preferable that in the carcass of the bias structure, at least an average cord distance between the adjacent ply layers at the middle ply group is made substantially wider than at the outer ply group. According to the invention, the reason why the region in the bead portion is within a range of 0.15 to 0.45 times a tire height as measured from the bead base of the tire is based on the fact that when the region is less than 0.15 times, the movement of the bead portion itself is small and also the compression strain is small, while when the region exceeds 0.45 times, the flexibility is large and the compression strain is small or the tensile strain increases. Furthermore, it is preferable that the average cord distance in the middle and outer ply groups is within a range of 0.6 to 3.5 times the cord diameter.

As a result of various investigations on the above carcass structure, it has been determined that the outermost ply layer or outer two to three ply layers near the outer surface of the toroidal casing is not affected significantly by cord fatigue even when such ply layer is subjected to strong compression force under the overload as previously mentioned. This interesting phenomenon is considered to be due to the fact that since the above ply layer is actually adjacent to an outer rubber layer of the side portion, it is released from a strong interference due to mutual adjoining of plural ply layers and can escape toward the outer rubber layer under the above compression force. As a result stress or strain due to compression is mitigated. Therefore, the definition of the invention relating to the cord distance is not always applied to the outermost ply layer or outer two to three ply layers, but such ply layers may rather be utilized to adjust the appearance of the side portion in the tire.

In the heavy duty pneumatic tire wherein the carcass of bias structure is composed of plural rubberized laminated ply layers each containing organic fiber cords and divided into three ply groups by three bead cores, the fatigue failure produced at the outer ply group in the region extending from the upper area of the bead portion to the lower area of the shoulder portion results from the compression strain of cords due to the large compression force in the outer ply group because the larger the compression force, the larger the compression strain, a fatal drawback of this tire is based on the carcass structure of plural ply layers. In this connection, the compression force subjected to the outer ply group can be somewhat reduced by making the cord distance at this group wider as previously mentioned. However, it is effective to directly mitigate the compression strain of the cords in order to prevent the occurrence of the fatigue failure. For this purpose, the cord distance at the middle ply group is particularly made wider. As a result, it is not necessary to make the cord distance at the outer ply group wider than that of the middle ply group. In this case, the compression strain of the cord at the outer ply group can largely be reduced, whereby remarkable improvement of the fatigue resistance of the carcass as a whole is effectively realized as compared with the case of making the cord distance at the outer ply group wider.

Moreover, the widening of the cord distance at the outer ply group itself is, of course, effective to the fatigue resistance, so that when the cord distance of the outer ply group is wider than that of the inner ply group but narrower than that of the middle ply group, the improvement of the fatigue resistance becomes conspicuous with the slight increase of the tire weight.

The inside of the toroidal casing, particularly the inner portion with respect to the thickness center of the casing or the inner ply group is not subjected to the compression stress as mentioned above, or if the compression stress is applied, it is small when compared with the case in the outer portion with respect to the thickness center. It is therefore not necessary to make the cord distance of the inner ply group wide. Inversely, the widening of the cord distance at the inner ply group causes the promotion of heat generation produced during the running of the tire under load, the obstruction of heat dissipation and hence the degradation of separation resistance property, so that remarkable benefits are not obtained.

Even when the cord distance is made wider at the outer and middle ply groups than at the inner ply group, it still affects the heat generation and heat dissipation, so that the excessive widening of such cord distance is not favorable. Therefore, it is practically preferable that the average cord distance at the middle and outer ply groups is within a range of 0.6 to 3.5 times a diameter of the cord used, on average.

Particularly, in order to advantageously improve the fatigue resistance of the carcass while controlling the increase of the tire weight at minimum, if the cord distance at the middle ply group is made wider over a predetermined range, the heat generation and heat dissipation become disadvantageous. In this case, therefore, it is desirable that this cord distance is within a range of 0.6 to 2.5 times, preferably 0.6 to 1.8 times a diameter of the cord used.

Figure 2:
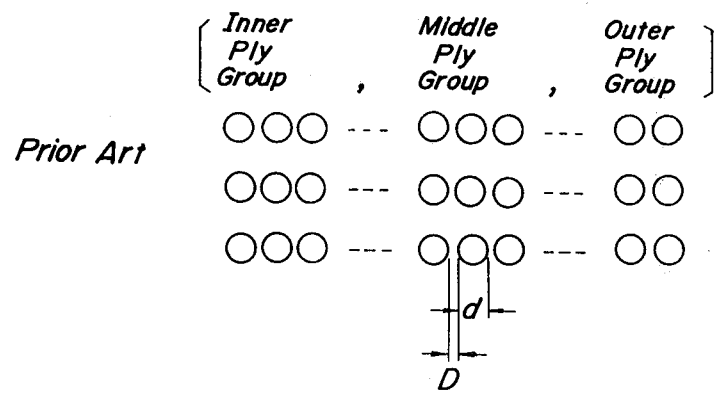
Figure 2:
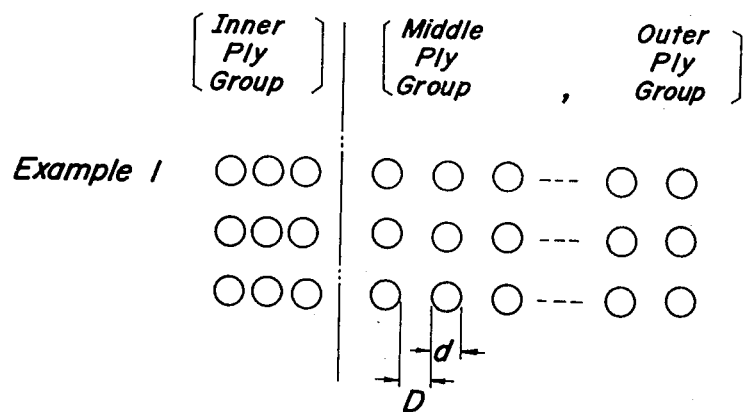
Figure 2:
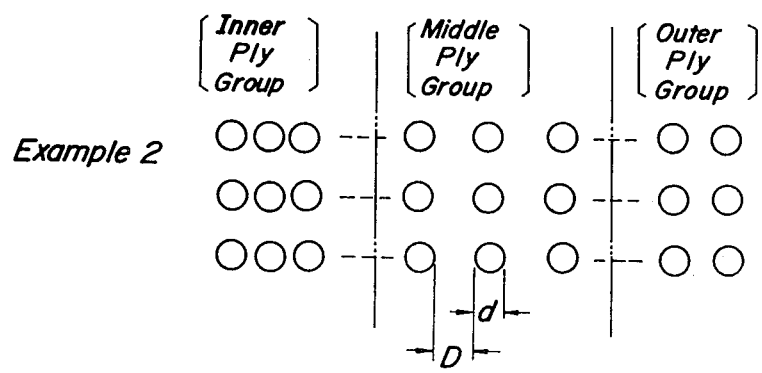

The invention will now be described with reference to the accompanying drawings, wherein:

FIG. 1 is a radial half section of an embodiment of the heavy duty pneumatic tire according to the invention; and FIG. 2 is a diagrammatical view showing a relation of cord distance between adjacent ply layers to cord diameter in the invention and the prior art.

In FIG. 1 is shown a right half section of the tire according to the invention, wherein numeral 1 is a tread acting as a wearing surface of the tire, numeral 2 a carcass composed of rubberized laminated ply layers each containing organic fiber cords embedded therein, numeral 3 an inner liner, numeral 4 an outer rubber layer of a side portion and numeral 5 a bead core.

The carcass 2 has a so-called bias structure of at least 12 rubberized laminated ply layers each containing organic fiber cords embedded therein, the cords of which being crossed with each other, and forms a skeleton of a toroidal casing C inclusive of the tread 1.

In the illustrated tire having a tire size of 52×22.5-23 28PR, the carcass composed of 22 ply layers each containing nylon cords of 840 d/2 with a cord diameter of 0.51 mm is divided into three ply groups $2_1$, $2_2$ and $2_3$ by three bead cores $5_1$, $5_2$ and $5_3$, each of the ply layers is turned up around the corresponding bead core from inward to outward according to the usual manner.

In the above three ply groups, i.e. inner carcass is $2_1$, middle carcass $2_2$ and outer carcass is $2_3$, a cord distance between adjacent ply layers of each ply group is generally designated as D. In the control tire, a ratio of cord distance (D) to cord diameter (d) in all of the three ply groups is 0.2 as usual. On the other hand, a tire was manufactured according to the invention for test purpose, i.e. this tire (Example 1) having D/d=0.2 in the inner ply group and D/d=2.5 in the middle and outer ply groups. After each of these two tires was mounted to an airplane, a DC-10 as a main tire, a durability of the tire until the occurrence of CBU was tested on a drum under a 120% loading of maximum static load to obtain a result as shown in the following Table 1. Moreover, the durability is evaluated by an index on the basis that the control tire is 100.

TABLE 1

| | Control tire | Example 1 |
|---|---|---|
| Durability | 100 | 772 |

In the above embodiment, it has been demonstrated that durability against CBU is considerably improved when the cord distance between the adjacent ply layers is made wider at the outer ply group and further the middle ply group than at the inner ply group in the three ply groups of the carcass composed of plural ply layers. In this case, it is necessary that attention to the cord distance is applied to a region extending from an upper area of a bead portion 6 to a lower area of a shoulder portion 7, i.e. a range of 0.15 to 0.45 times a tire height H as measured from a bead base B, which is defined by a straight line passing an intersection P of an extension of an inner peripheral contour of the bead portion 6 with an extension of an outer surface contour of the bead portion 6 and parallel to the rotational axis of the tire as shown in FIG. 1. In FIG. 1, an upper and lower limit of the region are shown by $h_1$ and $h_2$, respectively.

Then, there were provided five tires having substantially the same construction as shown in FIG. 1 and a tire size of 40×14-24PR, wherein the carcass composed of 16 ply layers each containing nylon cords of 840 d/2 with a cord diameter of 0.51 mm was divided into three ply groups $2_1$, $2_2$ and $2_3$ by three bead cores $5_1$, $5_2$ and $5_3$. Among these tires, a first tire had a ratio D/d=0.2 in all of the ply groups as a control tire, a second tire had D/d=0.8 in all of the ply groups as a comparative example 1, a third tire had D/d=0.2 in the inner ply group, D/d=0.8 in the middle ply group and D/d=1.9 in the outer ply group as a comparative example 2, and a fourth tire (Example 2) and a fifth tire (Example 3) had D/d as shown in the following Table 2. After each of these tires was mounted to an airplane, a B-737 as a main tire, the durability until the occurrence of CBU was tested on a drum under a 120% loading of maximum static load to obtain a result as shown in Table 2 by an index on the basis that the control tire is 100. And also, the increment of tire weight to the control tire is shown in Table 2.

|  | Ratio of cord distance to cord diameter D/d | | | Durability (index) | Increment of tire weight (kg) |
| --- | --- | --- | --- | --- | --- |
|  | inner ply group | middle ply group | outer ply group | | |
| Control tire | 0.2 | 0.2 | 0.2 | 100 | 0 |
| Comparative example 1 | 0.8 | 0.8 | 0.8 | 150 | 6 |
| Comparative example 2 | 0.2 | 0.8 | 1.9 | 600 | 4 |
| Example 2 | 0.2 | 1.3 | 0.2 | 600 | 2 |
| Example 3 | 0.2 | 1.3 | 0.8 | 850 | 4.5 |

In Example 2, the increase of the tire weight is considerably controlled, while the improvement of the durability is remarkable. In Example 3, the controlling effect against the increase of the tire weight is not very high, but the improvement of the durability is particularly conspicuous.

As apparent from the above, the durability against CBU can considerably be improved without controlling the increase of the tire weight at minimum when the carcass composed of plural ply layers is divided into the three ply groups and the cord distance between the adjacent ply layers in each ply group is determined according to the defined relationship.

According to the invention, the durability performances of pneumatic tires requiring the adaptation to severe safely standards under a high load are effectively improved without particularly increasing the tire weight.

What is claimed is:

1. A heavy duty pneumatic tire comprising a carcass of a bias structure composed of a least 12 rubberized laminated ply layers each containing organic fiber cords embedded therein, and divided into three groups, an inner group, a middle group and an outer ply group by three bead cores, the cords in said inner, middle and outer ply groups having the same diameter, said cords crossed with each other as a reinforcement for a toroidal casing inclusive of a tread, wherein in a region extending from an upper area of a bead portion of said casing within a range of 0.15 to 0.45 times a tire height as measured from a bead base of the tire, at least an average cord distance between adjacent ply layers at said middle and outer ply groups is made substantially wider than at said inner ply group and, a cord distance between adjacent ply layers at said outer ply group is substantially equal to that at said middle ply group and is within a range of 0.6 to 3.5 times a diameter of said cord used in the outer portion of the toroidal casing.

2. A heavy duty pneumatic tire comprising a carcass of a bias structure composed of at least 12 rubberized laminated ply layers each containing organic fiber cords embedded therein, and divided into three groups, an inner group, a middle group and an outer ply group by three bead cores, the cords in said inner, middle and outer ply groups having the same diameter, said cords crossed with each other, as a reinforcement for a toroidal casing inclusive of a tread, wherein in a region extending from an upper area of a bead portion of said casing within a range of 0.15 to 0.45 times a tire height as measured from a bead base of the tire, at least an average cord distance between adjacent ply layers at said middle and outer ply groups is made substantially wider than at said inner ply group and, a cord distance between adjacent ply layers at said middle ply group is substantially larger than at said outer ply group and is within a range of 0.6 to 2.5 times a diameter of said cord used.

* * * * *